(12) United States Patent
Michely et al.

(10) Patent No.: US 6,603,239 B1
(45) Date of Patent: Aug. 5, 2003

(54) MICROMANIPULATOR WITH PIEZOELECTRIC MOVEMENT ELEMENTS

(75) Inventors: Thomas Michely, Sankt Augustin (DE); Marcel Rost, Leiden (NL); Markus Kaiser, Arnsberg (DE)

(73) Assignee: Forschungszentrum Julich GmbH, Julich (DE)

( * ) Notice: Subject to any disclaimer, the term of this patent is extended or adjusted under 35 U.S.C. 154(b) by 0 days.

(21) Appl. No.: 10/048,728

(22) PCT Filed: Jul. 11, 2000

(86) PCT No.: PCT/EP00/06554

§ 371 (c)(1),
(2), (4) Date: Feb. 25, 2002

(87) PCT Pub. No.: WO01/09965

PCT Pub. Date: Feb. 8, 2001

(30) Foreign Application Priority Data

Jul. 30, 1999 (DE) .......................... 199 35 570

(51) Int. Cl.⁷ .......................... H02N 2/00; H01L 41/08
(52) U.S. Cl. ........................................ 310/328
(58) Field of Search .......................... 310/328

(56) References Cited

U.S. PATENT DOCUMENTS

| | | | | |
|---|---|---|---|---|
| 4,240,141 A | * | 12/1980 | Vasiliev et al. | 248/38 |
| 4,249,100 A | * | 2/1981 | Vasiliev et al. | 310/317 |
| 4,677,378 A | * | 6/1987 | Tokura et al. | 123/616 |
| 4,785,177 A | * | 11/1988 | Besocke | 250/306 |
| 5,214,342 A | 5/1993 | | Yang | 310/328 |
| 5,500,535 A | * | 3/1996 | Jing | 250/306 |
| 6,378,672 B1 | * | 4/2002 | Wakui | 188/378 |
| 2002/0088280 A1 | * | 7/2002 | Takasan et al. | 73/570.5 |

FOREIGN PATENT DOCUMENTS

| | | | | |
|---|---|---|---|---|
| DE | 36 10 540 | | 3/1989 | ............ B25J/7/00 |
| DE | 38 44 659 | | 11/1990 | ............ B25J/7/00 |
| DE | 38 22 504 | | 10/1992 | ............ B25J/7/00 |
| DE | 38 44 821 | | 7/1993 | ............ B25J/7/00 |
| DE | 44 19 134 | | 12/1995 | ............ B25J/15/06 |
| DE | 197 15 226 | | 10/1998 | ............ G12B/1/00 |
| DE | 197 44 126 | | 4/1999 | ............ H02N/2/04 |
| EP | 0388023 | * | 9/1990 | ............ G01L/5/00 |
| EP | 0 923 144 | | 6/1999 | ............ H01L/41/09 |
| JP | 2-219455 | * | 9/1990 | ............ 310/311 |
| JP | 6-269178 | * | 9/1994 | ............ 310/328 |
| JP | 2002-90282 | * | 3/2002 | ............ G01N/13/10 |
| WO | WO-96/06482 | * | 2/1996 | ............ H02N/2/00 |

OTHER PUBLICATIONS

Method to Characterize the Vubrational Response of a Beetle Type Scanning Tunelling Microscope by Behler et al. Rev. Sci. Instrum. 68 (1), Jan. 1997.
German Search Report issued Apr. 7, 2000.

* cited by examiner

Primary Examiner—Thomas M. Dougherty
(74) Attorney, Agent, or Firm—Herbert Dubno

(57) ABSTRACT

The invention relates to a micromanipulator (1, 8, 14, 35) which is used to produce a relative movement between said micromanipulator and an object (7, 13, 25, 34). The micromanipulator (1, 8, 14, 35) has piezoelectric movement elements (3, 10, 15, 16, 17, 43, 44, 45) which are provided with end pieces (6, 12, 22, 23, 24, 46, 47, 48). The inventive micromanipulator is characterized in that the end pieces (6, 12, 22, 23, 24, 46, 47, 48) are magnetic or can be magnetized.

7 Claims, 5 Drawing Sheets

MICROMANIPULATOR WITH PIEZOELECTRIC MOVEMENT ELEMENTS

CROSS REFERENCE TO RELATED APPLICATIONS

This application is a national stage of PCT/EP00/06554 filed Jul. 11, 2000 and based upon German national application 199 35 570.3 filed Jul. 30, 1999 under the International Convention.

FIELD OF THE INVENTION

The invention relates to a micromanipulator for producing a relative movement between itself and an object, whereby the micromanipulator has piezoelectric movement elements which are provided with end pieces.

Micromanipulators of this type are used to effect movement in scanning tunnel microscopes (STM) or scanning force microscopes or atomic force microscopes (SFM or AFM). Here the highest possible degree of precision is required for the movement of the sensing needle (tunnel tip) relative to the object to be investigated by the micromanipulator.

BACKGROUND OF THE INVENTION

In DE 36 10 540 C2, a micromanipulator is described in which, for the support of the object to be investigated, a multiplicity of movement elements of piezoelectric materials are fastened on a base plate. The movement elements are so configured that they can effect micromovements of an object or object holder resting on the movement elements, e.g. translational movements and rotational movements, as well as a tilting of the object. The described micromanipulator is arranged for micromovement of the object with any optional micromovement. Perpendicular to the object plane, movements are effected only to the extent that they are permitted by the deformation of the piezoelectric materials by the applied electrical voltage.

In DE 38 22 504, a further development of the aforedescribed micromanipulator is disclosed. Ii it the movement elements are arranged on a part which is movable against the force of a spring relative to the base plate, whereby via the spring a micromovement of the order of magnitude of several tenths of a millimeter is effected perpendicular to the object plane while maintaining its basically horizontal orientation. A similar effect can be produced with the configuration of a micromanipulator according to DE 38 44 659 A1.

In FIG. 6 of this document an embodiment is disclosed in which the micromanipulator in an inverted arrangement is configured as a runner which extends above the piezoelectric movement elements on an object. The runner can be moved entirely translatorily or rotationally in a horizontal plane or in a plane tilted thereto at a small angle. With the aid of such a micromanipulator, even larger objects can be analyzed without detriment.

In DE 38 44 821 C2, a micromanipulator is disclosed in which the movement elements are provided with end pieces for the apparatus which are so mounted in axially extending bushings that friction forces between mutually bounding surfaces at end pieces and bushings hinder a movement of the support in the bushing. The frictional forces are so dimensioned that they on the one hand suffice to brace the object or the object holder and, on the other hand, by application of voltage functions to the piezoelectric material achieve a sliding of the end piece in the bushing in the axial direction. Thus by piezoelectric deformation the adhesion friction forces between end piece and bushing are eliminated and the relative movement is produced by inertia. In this configuration, the movement elements are perpendicular to the shaping or analysis plane for the micromovement and the macromovement of the object or object holder is utilized. In any case, the micromovements remain limited to a fraction of the length of the movement element.

A basic problem in the use of scanning probe microscopes (scanning tunnel microscopes and scanning force microscopes) resides in the fact that in the investigation of certain surface regions on a workpiece, a sample must be separated therefrom which contains the surface to be investigated. The sample is then introduced into the microscope apparatus. The separation can only be avoided in those particular cases in which the workpiece itself is very small or in an appropriate shape for investigation in the microscope apparatus. In many cases the need for taking a sample prevents microscopic investigation, for example, when the workpiece on objective grounds or because cost should not be damaged or because of its geometry is not capable of being introduced into the microscope apparatus as is the case, for example with an engine block, a bridge girder, etc.

Up to now, no scanning probe microscope or micromanipulator is known which is suitable for the investigation of optional locations on large immovable workpieces. This is because of one or more of the following reasons:

(i) The scanning probe microscope is not functionally suitable because of its excess sensitivity with respect to noise and vibration without special oscillation damping.

(ii) The scanning probe microscope requires the proximity of probe and sample and for the investigation of the sample, a certain sample orientation.

(iii) The scanning probe microscope does not structurally permit the approximation of a probe to an optional location of the sample on a workpiece with the requisite precision and closeness required in the scanning probe microscope.

Thus for scanning probe microscopes of the above described types, all three of the mentioned reasons are applicable.

Especially the sensitivity identified under (i) of the scanning probe microscope to noise and vibration is a basic problem in the use of all scanning probe microscopes. Thus the operation of variable temperature scanning probe microscopes of the above described types (compare Bott et a., "Design Principles of a variable temperature scanning tunneling microscope", Rev. Sci. Instrumen. 66 (8), August 1995, P. 4135 to 4139) is affected by the boiling of the coolant to a significant degree through vibration.

The application force between the object or the object holder with the sample and the microscope or of the runner on the object or the object holder has been only a result of the intrinsic weight. The application force is only small and gives rise, at the bearing points in the presence of environmental noise or vibration to relative movement between the micromanipulator and object or object holder (compare Behler et al, "Method to characterize the vibrational response of a beetle type scanning tunneling microscope", Rev. Sci. Instrum. 68 (1), January 1997, P. 124 to 128). To solve this problem, various possibilities have been proposed in this document, for example, the reduction of the possibility of introduction of the environmental noise by improved vibration insulation or the change in the configuration of the micromanipulator to increase the application force, e.g. by increasing the weight or by the use of a magnetic or electrostatic clamping of the microscope and object. As to how this can be achieved in detail, the document sheds no light. If the piezoelectric movement elements are loaded, the aforementioned problems are not resolved. The internal resonance frequency of the movement elements decreases sharply by loading and thus again gives rise to increased sensitivity of the scanning probe microscope to environmental noise and vibration.

OBJECT OF THE INVENTION

The invention thus has as its object a micromanipulator of the type mentioned at the outset but of reduced sensitivity to environmental noise or vibration so that it can also be used at optional locations on a large object without requiring comminution of it.

SUMMARY OF THE INVENTION

This object is achieved in accordance with the invention in that the end pieces are magnetic or magnetizable. With end pieces configured in accordance with this feature, the application force can be significantly increased. To the extent that the end pieces are magnetic, it suffices that the object to be investigated—or the object holder—be composed of a magnetizable material or have a magnetizable coating. If the end pieces are only configured to be magnetizable, it is necessary for increasing the application force that the object itself—or the object holder—be magnetic. The advantage of the micromanipulator with the configuration according to the invention is that the piezoelectric material of the movement elements is not loaded by the increase in the application force since the application force increase is exclusively effected between the end pieces of the movement elements and the object or object holder. As a result there does not arise a reduction in the intrinsic resonance of the movement elements. Rather there is an increase in the intrinsic resonance because of the bond with the workpiece. This enables the micromanipulator to be used under normal environmental conditions without external vibration damping and in spite of it to obtain a high resolution of better than 1 nm on an optional object. The invention thus presents especially an improvement for all micromanipulators in the significant elimination of vibration or ambient noise or where an insulation from such detrimental influences is not possible.

The further advantage of the micromanipulator configured in accordance with the invention is that because of the great adhesive force between the micromanipulator and object—or object holder—the function of the micromanipulator in any optional orientation is ensured and is no longer limited to a substantially horizontal orientation of the plane of the end pieces (and thus the object). This enables especially the micromanipulator to be operated at any optionally oriented location of a large object without comminuting it. This feature also enables objects to be transported in optional directions over macroscopic and structurally unlimited distances.

To the extent that the end pieces are of magnetic configuration, the invention provides that the end pieces be comprised at least partly of magnetic material. Alternatively, the end pieces can also be comprised at least partly of magnetizable material and that they be juxtaposed each with a respective magnet which magnetizes the end piece. For the magnets, permanent magnets or electromagnets can answer.

In a further feature the invention provides that the micromanipulator has an object holder which rests upon end pieces and is configured to be magnetic or magnetizable. Thus the object holder can be applied to an object or a part thereof. Such an object holder is concerned with very small workpieces which should be investigated. When the end pieces are magnetic, it suffices for the object holder to be comprised of a magnetizable material. If the end pieces are only magnetizable, the object holder should itself be magnetic to increase the application force between end pieces and object holder. The magnetic characteristics of the object holder can be obtained by means of permanent magnets or electromagnets.

BRIEF DESCRIPTION OF THE DRAWING

The invention is described in greater detail in the drawing based upon examples. The drawing shows.

SPECIFIC DESCRIPTION

Figure 1:
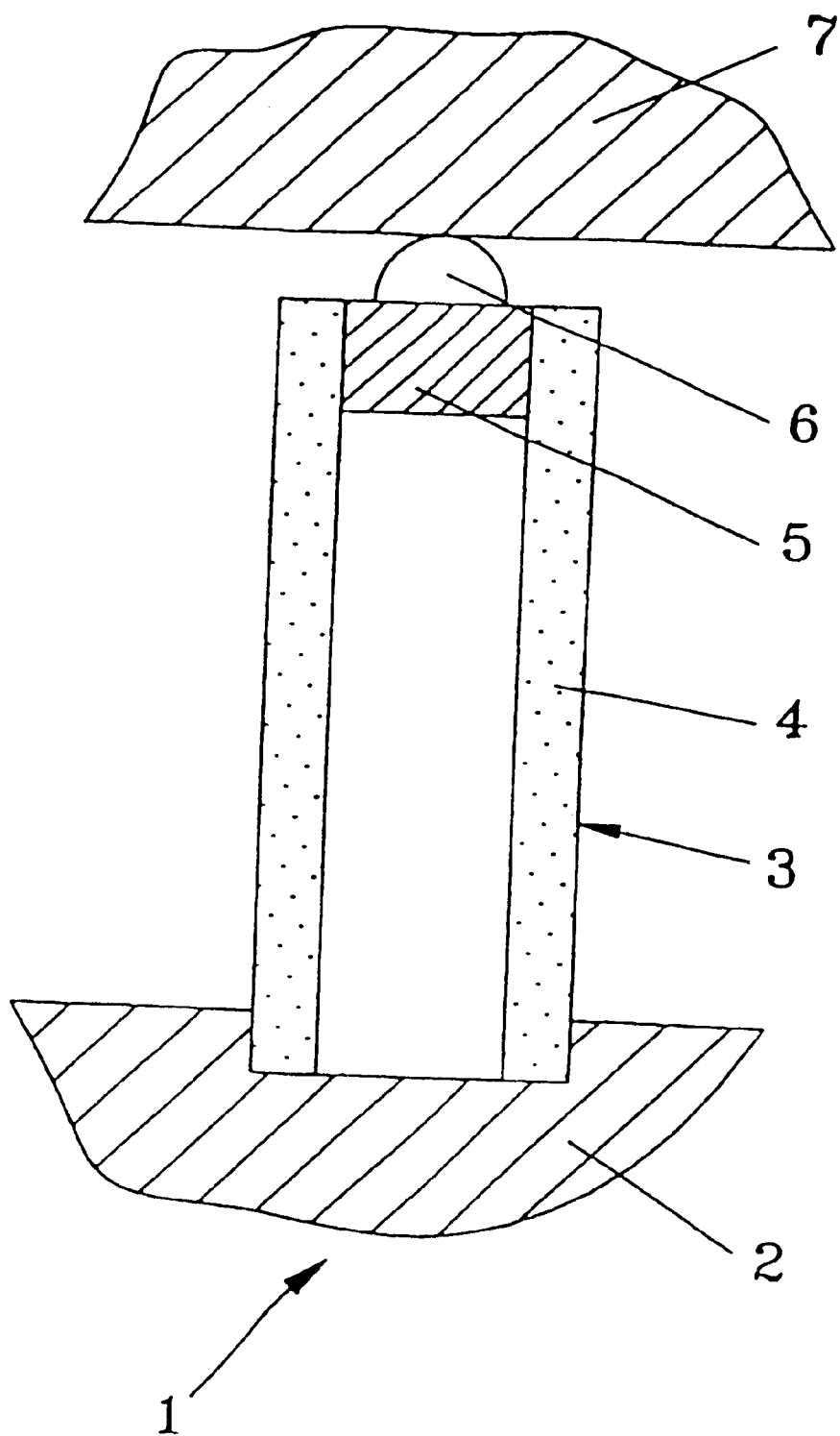
FIG. 1 a vertical section through a movement element of a micromanipulator according to the invention.

The micromanipulator partly shown in FIG. 1 has a base plate 2 from which a movement element 3 extends vertically upwardly. Apart from this movement element, two further movement elements, here not shown but oriented in parallel, as well as a scanning element, likewise arranged in a parallel orientation and centrally of the movement element 3 are provided so that the micromanipulator in its basic configuration corresponds to the micromanipulators like those of FIG. 1 of DE 36 10 540 C2, DE 38 22 504 C2 and DE 38 44 659 A1.

The movement element 3 has a small tube 4 of piezoelectric material, whose lower end is recessed in the base plate 2. In the region of the upper end, a disk-shaped magnet 5 is inset and is magnetized in the direction of the longitudinal axis of the small tube 4.

On the upper side of the magnet 5 a hemispherically-shaped end piece 6 is glued and is composed of a magnetizable material. This end piece rests against the underside of the object 7 to be investigated and which is also composed of a magnetizable material or is provided at least on its underside with a coating of such material. Because of the magnetization of the end piece 6 by the magnet 5, the application force of the object 7 on the end piece 6 is increased by up to two orders of magnitude. Since the remaining movement elements are identically configured, this also applies for these movement elements. The small tube 4 is provided with suitable electrodes so that a relative movement between the small tube 4 and the magnet 5 can be effected utilizing the teachings of DE 38 44 821 C2 to produce micromovements with respect to the object 7.

Figure 2:
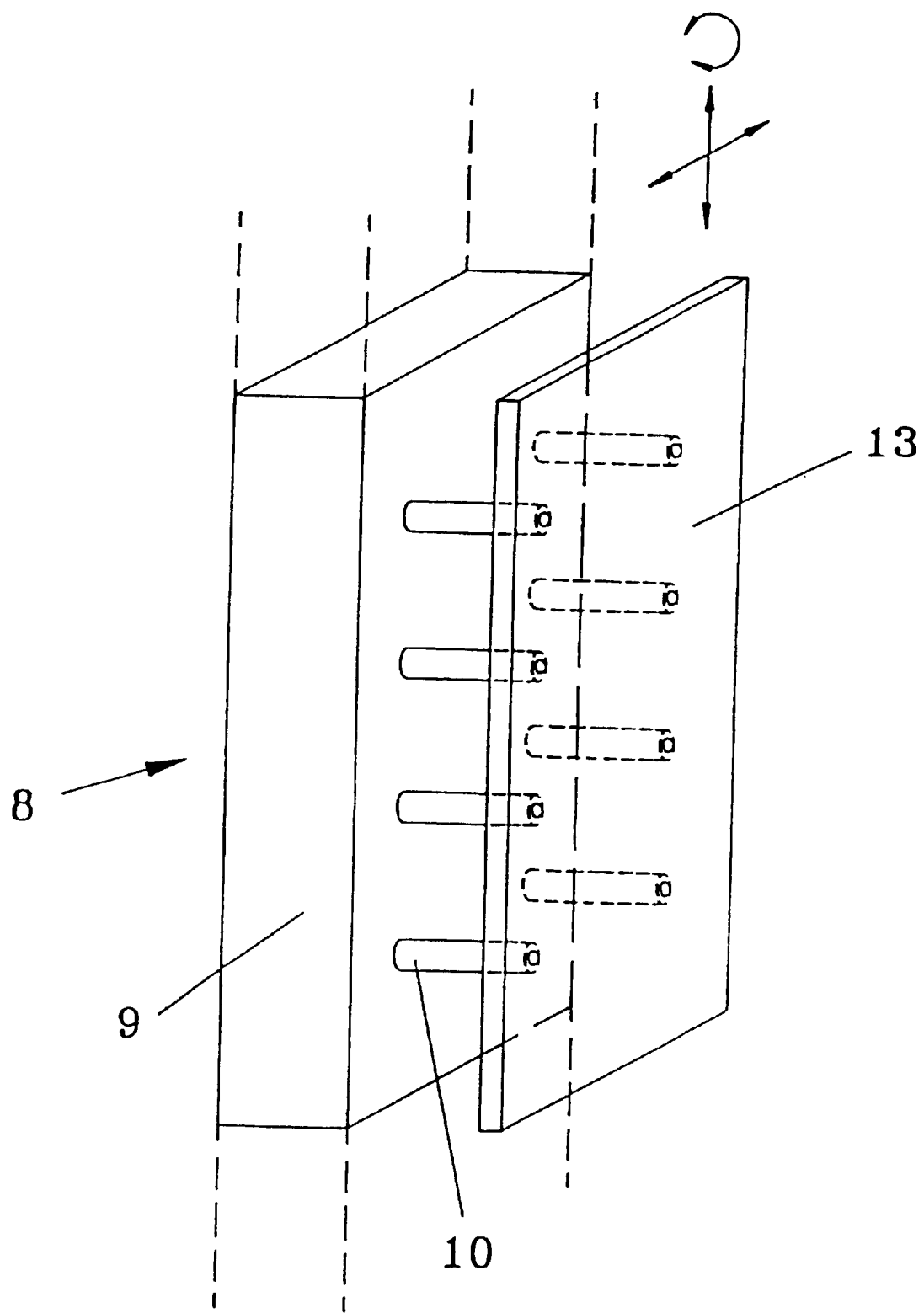
FIG. 2 a micromanipulator for flat objects.

The micromanipulator 8 shown in FIG. 2 has a vertically arranged base plate from which a total of 8 movement elements—for example designated at 10—project horizontally.

Figure 3:
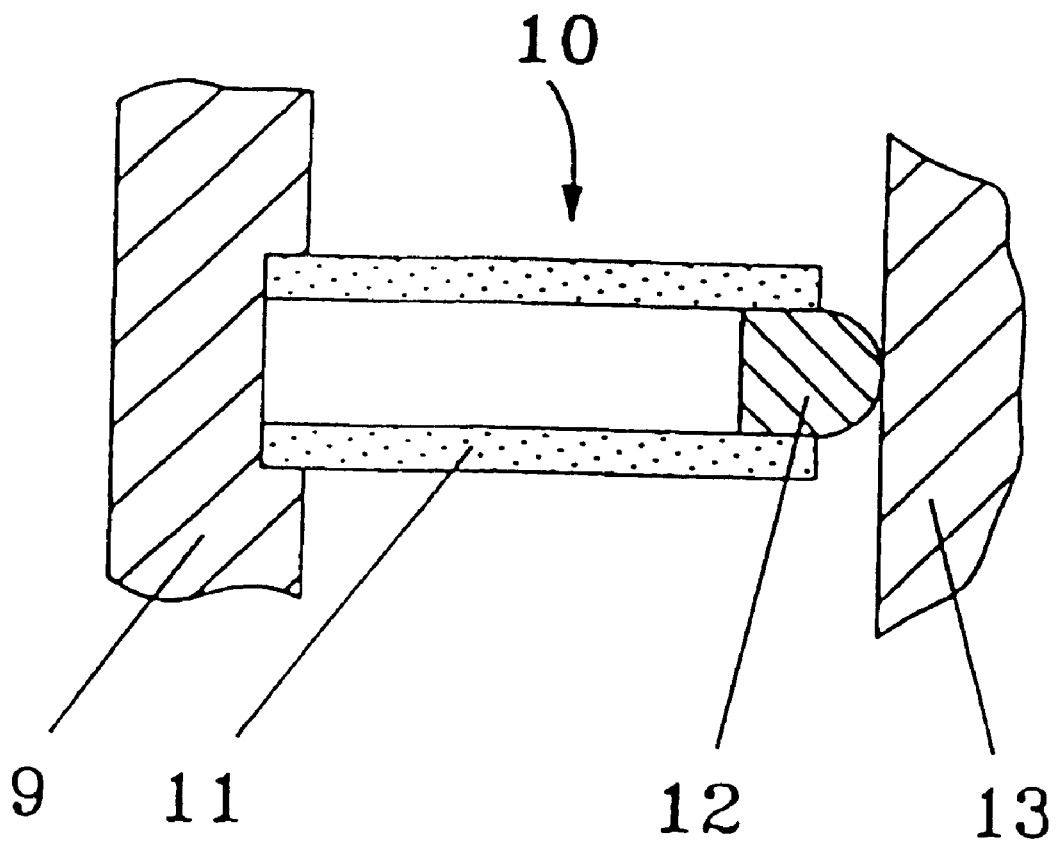
FIG. 3 a longitudinal section through a movement element of a micromanipulator according to FIG. 2.

As FIG. 3 indicates, the movement elements 10 here are small tubes 11 of piezoelectric material. In the free ends of the tubes 11, end pieces 12 with hemispherical tips are inserted which function as magnets.

A plate-shaped object 13 rests against the movement elements 10 and is composed of a magnetizable material or has a magnetic coating or guide. With the aid of the movement elements 10, the object 13 can have micromovements imparted to it in optional directions, particularly in the vertical direction. To the extent that FeNeB magnets with a diameter of 2 mm and a length of 1.5 mm are used, retaining forces per contact point of about 0.5 N can be produced. The total holding force $F_H$ is given by the addition of the retaining forces of the individual contact points. The maximum vertical transportable load with a weight $F_G$ can be obtained by the Armontonic law and amounts for an adhesion friction coefficient $\mu_H$ typically to $F_G \approx \mu_H F_H$, i.e. several tenths of the magnitude of the summed adhesion forces.

Figure 4:
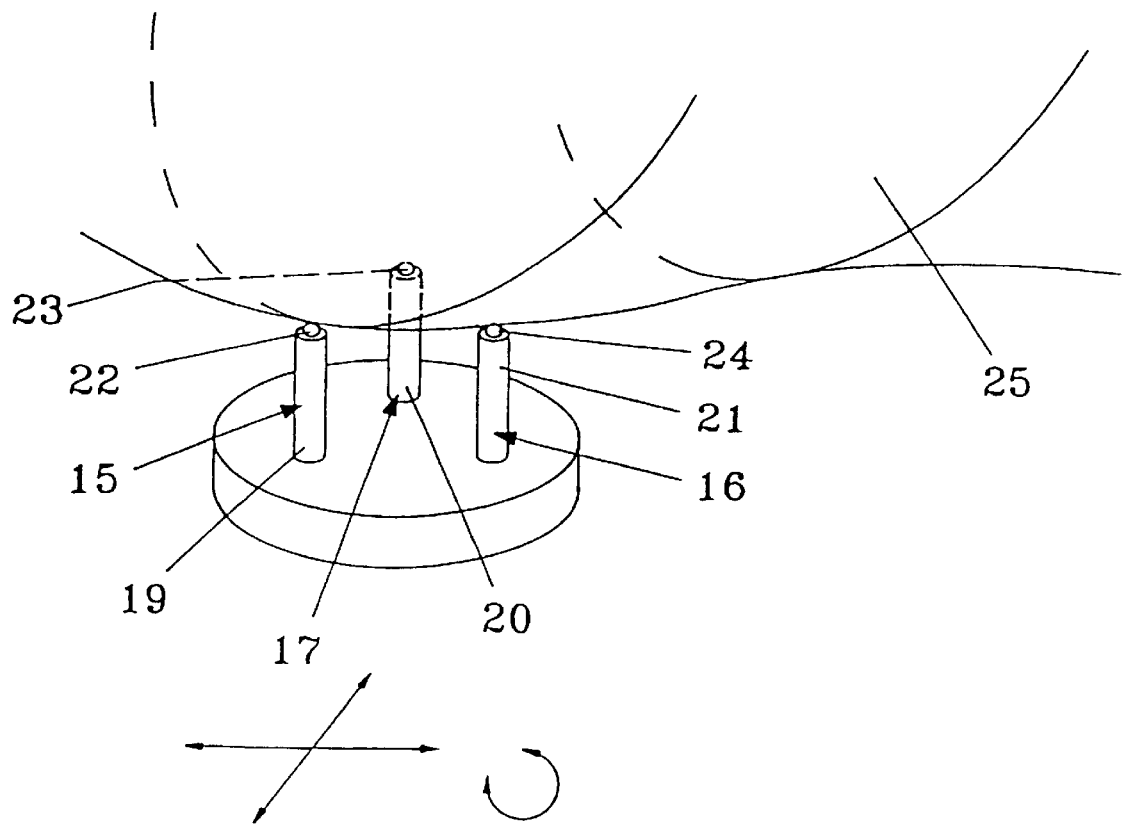
FIG. 4 a micromanipulator as a runner on an object in a perspective view.

FIG. 4 shows a further micromanipulator 14 in the form of a runner. It has three movement elements 15, 16, 17, arranged in a triangle and projecting vertically from a base plate 18. The movement elements 15, 16, 17 are identical with the movement elements 10 in the micromanipulator 8 according to FIGS. 2 and 3 and have each, respectively a small tube 19, 20, 21 in whose free ends respective end pieces 22, 23 and 24 are inset and are formed as magnets.

The micromanipulator 14 bears on the underside of an object 25 of magnetizable material and the retaining force generated by the end pieces 22, 23 and 24 is greater than the weight of the magnet manipulator 14. It can thus be moved over the object 25 in any optional direction in space. Thus the object 25 need not necessarily be planar. It is sufficient when the local radii of curvature of the object 25 is at least of the order of magnitude of the spacing of the movement elements 15, 16, 17. Such a micromanipulator can thus be displaced in pipes.

Figure 5:
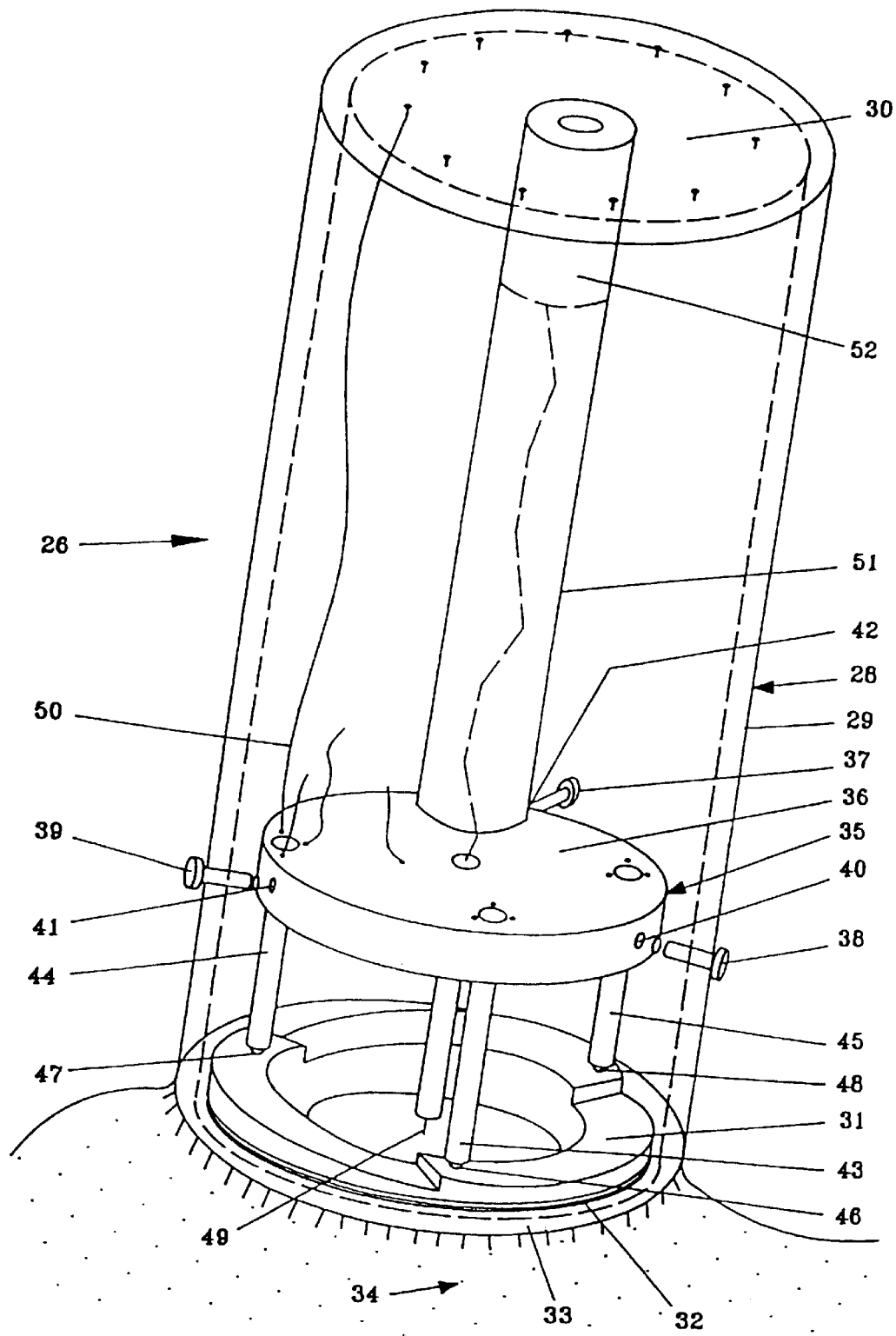
FIG. 5 a scanning tunnel microscope with an object.

In FIG. 5, a scanning tunnel microscope 26 has been illustrated which can be used for optional sample locations on large immovable objects which are unsuitable for the removal of samples therefrom. The scanning tunnel microscope 26 has a housing 28 which is composed of a cylinder segment 29 of transparent material and a plug plate 30 closing one side of it. On the object side, the housing 28 is closed by a ramp ring 31 which is threaded onto the cylinder segment 29 by a screw thread 32 to a stop 33. The ramp ring 31 is attached, for example by gluing, by adhesion or by a screw thread connection with an object 34.

In the housing 28 there is a micromanipulator 35 of the runner type whose base plate 36 initially is retained by means of locking screws 37, 38, 39 on the cylinder segment 29 and in which the locking screws 37, 38 and 39 extend through the cylinder segment 29 and engage in locking holes 40, 41, 42 of the base plate 36. From the side of the base plate turned toward the object 34, movement elements 43, 44, 45 project, the movement elements having their free ends provided with magnetic end pieces 46, 47, 48. They are configured exactly like the movement elements 10, 15, 16, 17 of the micromanipulators 8, 14, according to FIGS. 2–4. From the middle of the base plate 36 projects a tunnel microscope tip 49 in the direction of the object 34 which serves for the analysis.

The use of the scanning tunnel microscope 26 is effected in that initially the ramp ring 21 is applied to the object 34. Then the housing 28 is screwed onto the ramp ring 31 until it reaches the stop 33, whereby the micromanipulator 35 is initially fixed via the locking screws 37, 38, 39. After removal of the locking screws 37, 38, 39, the magnetic end pieces 46, 47, 48 effect a movement of the micromanipulator 35 until the end pieces 46, 47, 48 lie against the ramp ring 31. By application of suitable selected electrical pulses to the piezoelectric material of the movement elements 43, 44, 45, a rotation of the micromanipulator is effected counterclockwise to result, because of the shapes of the ramps of the ramp ring 31, in an approximation of the tunnel microscope tip 49 to the object 34, until the tunnel microscope tip lies in the requisite range for the measurement. Also by the application of suitably selected electrical pulses to the movement elements 43, 44, 45, a translation of the micromanipulator 35 can be effected and thus the desired location of the object 34 can be brought into the proximity of the tunnel microscope tip 49 and thus in the image field of the scanning tunnel microscope 26. The function of the tunnel microscope 26 does not, therefore, depend upon its orientation which can be dependent upon the orientation of the location to be investigated on the object 34.

The transparency of the cylinder segment 29 enables it to be located on the site of the object 34 to be investigated initially by means of optical microscopy and then controlled by the movement of the micromanipulator to bring that site into the image region of the scanning tunnel microscope 26. The electrical energy required for the actuation of the movement elements 43, 44, 45 is supplied to the plug plate 30 via thin wires which have, for example, been indicated at 50. The measured signal is initially passed through a metallic shielding tube 51 to an integrated preamplifier 52 before it is also delivered to the plug plate 30. From the plug plate 30 the scanning tunnel microscope 26 can be connected with the required measurement circuitry. The scanning tunnel microscope 26 has in the described example a length of about 12 cm and a diameter of about 4 cm.

Instead of the ramp ring, the approximation to the site to be explored on the object 34 can be effected by an inertial drive as is disclosed in DE 38 44 821 C2. In this case, a smooth ring without ramps suffices. In addition, the described arrangement can be used also as a scanning force microscope by replacement of the tunnel microscope tip 48 by a needle sensor corresponding to that of DE 195 13 529 A1 and then can be used also for the investigation of electrically nonconducting workpieces.

What is claimed is:

1. A micromanipulator for producing a relative movement between the micromanipulator and an object which has a surface at which the object is magnetically attractable, said micromanipulator comprising:

a support;

at least three piezoelectric movement elements extending from said support substantially perpendicular to said surface and having respective end pieces in continuous contact with said surface at spaced-apart locations on said surface and constituting the exclusive contacts of said manipulator with said object, said end pieces being magnetic or magnetizable to maintain the contact of said end pieces with said surface magnetically during relative movement of the micromanipulator and the object; and means for energizing said piezoelectric movement elements to effect relative movement of said micromanipulator and said object without loss of contact between said end pieces and said surface.

2. The micromanipulator defined in claim 1 wherein said end pieces are hemispherical and engage said surface substantially with point contact.

3. The micromanipulator defined in claim 2 wherein said end pieces are at last partly composed of magnetic material.

4. The micromanipulator defined in claim 2 wherein said end pieces are at last partly composed of magnetizable material and each of said end pieces is juxtaposed with a magnet forming part of the respective movement element.

5. The micromanipulator defined in claim 2, further comprising an object holder which is magnetic or magnetically permeable interposed between said elements and said object and forming said surface.

6. A scanning probe microscope comprising:
- a micromanipulator for producing a relative movement between the micromanipulator and an object which has a surface at which the object is magnetically attractable, the micromanipulator comprising:
- a support,
- at least three piezoelectric movement elements extending from said support substantially perpendicular to said surface and having respective end pieces in continuous contact with said surface at spaced-apart locations on said surface and constituting the exclusive contacts of said manipulator with said object, said end pieces being magnetic or magnetizable to maintain the contact of said end pieces with said surface magnetically during relative movement of the micromanipulator and the object, and
- means for energizing said piezoelectric movement elements to effect relative movement of said micromanipulator and said object without loss of contact between said end pieces and said surface; and
- a scanning microscope tip between said elements and juxtaposed with said object.

7. The scanning probe microscope defined in claim 6 wherein the micromanipulator has a magnetic or magnetically permeable object holder resting against said object and forming the surface engaged by said end pieces.

* * * * *